United States Patent [19] [11] 4,367,779
Ewig [45] Jan. 11, 1983

[54] HACKSAW WITH IMPROVED BLADE TENSIONING MECHANISM

[75] Inventor: John F. Ewig, Worcester, Mass.

[73] Assignee: Parker Manufacturing Company, Worcester, Mass.

[21] Appl. No.: 246,273

[22] Filed: Mar. 23, 1981

[51] Int. Cl.³ .................. B23D 49/12; B23D 51/10; B27B 21/06
[52] U.S. Cl. .............................. 145/33 A; 145/108 R
[58] Field of Search .............. 145/33 A, 33 AB, 33 R, 145/34 R, 35 R

[56] References Cited

U.S. PATENT DOCUMENTS 2,194,494  3/1940  Carroll .................. 145/33 A X
3,636,997  1/1972  Keymer .................. 145/33 A
3,822,731  7/1974  Keymer .................. 145/33 A

FOREIGN PATENT DOCUMENTS 487814  12/1929  Fed. Rep. of Germany .... 145/33 R
2293277   7/1976  France .............................. 145/33 A Primary Examiner—Frank T. Yost
Attorney, Agent, or Firm—Thompson, Birch, Gauthier & Samuels

[57] ABSTRACT

A hacksaw with an improved mechanism for adjusting the tension on the blade. The mechanism includes a lever for vertically moving a rod to pivot a rocker arm to place tension on the rocker arm-held blade. The rod has an adjustment knob at its lower end to precisely select final blade tension. The lever has a latch means for securely locking the lever closed, and the latch means has a safety feature which prevents accidental and sudden unlocking of the lever.

11 Claims, 6 Drawing Figures

HACKSAW WITH IMPROVED BLADE TENSIONING MECHANISM

BACKGROUND OF THE INVENTION

Applicant's invention is an improvement upon U.S. Pat. Des. No. 245,754. The hacksaw shown in that patent uses a bolt (having a wing-like bolt head) that is engaged to a nut which freely floats within the hollow handle. When the bolt head is turned by the user, it causes a rocker arm to pivot which pulls on the rear of the blade to increase blade pressure. This arrangement requires considerable force to be applied to the bolt head by the user, sometimes causes the threads on the bolt to strip, and occasionally results in the loss of the nut out of the top of the hollow handle when the bolt is backed off too far.

This invention is also an improvement on the hacksaw shown in U.S. Pat. No. 1,078,599. That patent shows a hacksaw which has a pivoted lever which cams a separate sliding pin against the head of a bolt to pivot a rocker arm to increase blade tension.

These two prior art patents constitute the closest prior art known to applicant.

SUMMARY OF THE INVENTION

This invention relates to a hacksaw having an improved blade tensioning mechanism which is carried by the hacksaw handle. A movable lever is pivoted at its upper end to the handle. The lever has a rod mounting portion at its upper end which extends forwardly of the lever pivot point.

A tension rod is pivoted at its upper end to the lever's rod mounting portion. The tension rod hangs down and can swing from its pivot point. The lever pivot point and the tension rod pivot point are located with relationship to each other so that when the lever is closed (i.e. pivoted clockwise), the tension rod is lifted, and when the lever is opened (i.e. pivoted counter-clockwise), the tension rod is lowered.

The tension rod is threaded at its bottom end and protrudes downwardly through an aperture formed in the rear end of a rocker arm which is pivoted to the lower portion of the hacksaw handle. A tension adjusting knob is threadably engaged to the lower end of the tension rod and bears against the underside of the rear end of the rocker arm. Turning the knob alters the distance between the rear end of the rocker arm and the tension rod pivot point.

The lever has a locking finger which swings into locking engagement with a latch bar that is spring-mounted within the handle interior. The shape of the locking finger prevents accidental sudden unlocking of the lever.

The hacksaw blade is mounted at its rear end to the front end of the pivoted rocker arm. Final blade tension is selected by turning the tension adjustment knob. Then, the lever is closed and locked to apply the selected blade tension. Tension is relieved by first squeezing the lever into the handle, then lifting the latch bar, and finally relaxing the pressure on the lever and allowing the lever to swing open.

DESCRIPTION OF THE DRAWINGS

FIG. 6 is an enlarged side elevation detail, in section, illustrating the lever locking finger and the latch bar.

DESCRIPTION OF THE PREFERRED EMBODIMENT

This invention is an improvement on the hacksaw shown in U.S. Pat. Des. No. 245,754. This patent is incorporated by reference and made a part of this disclosure. The differences between the patented hacksaw and the hacksaw of this invention are entirely found in the blade tensioning mechanism, so the other hacksaw components will only be briefly described because they are conventional and constitute no part of this invention.

Figure 1:
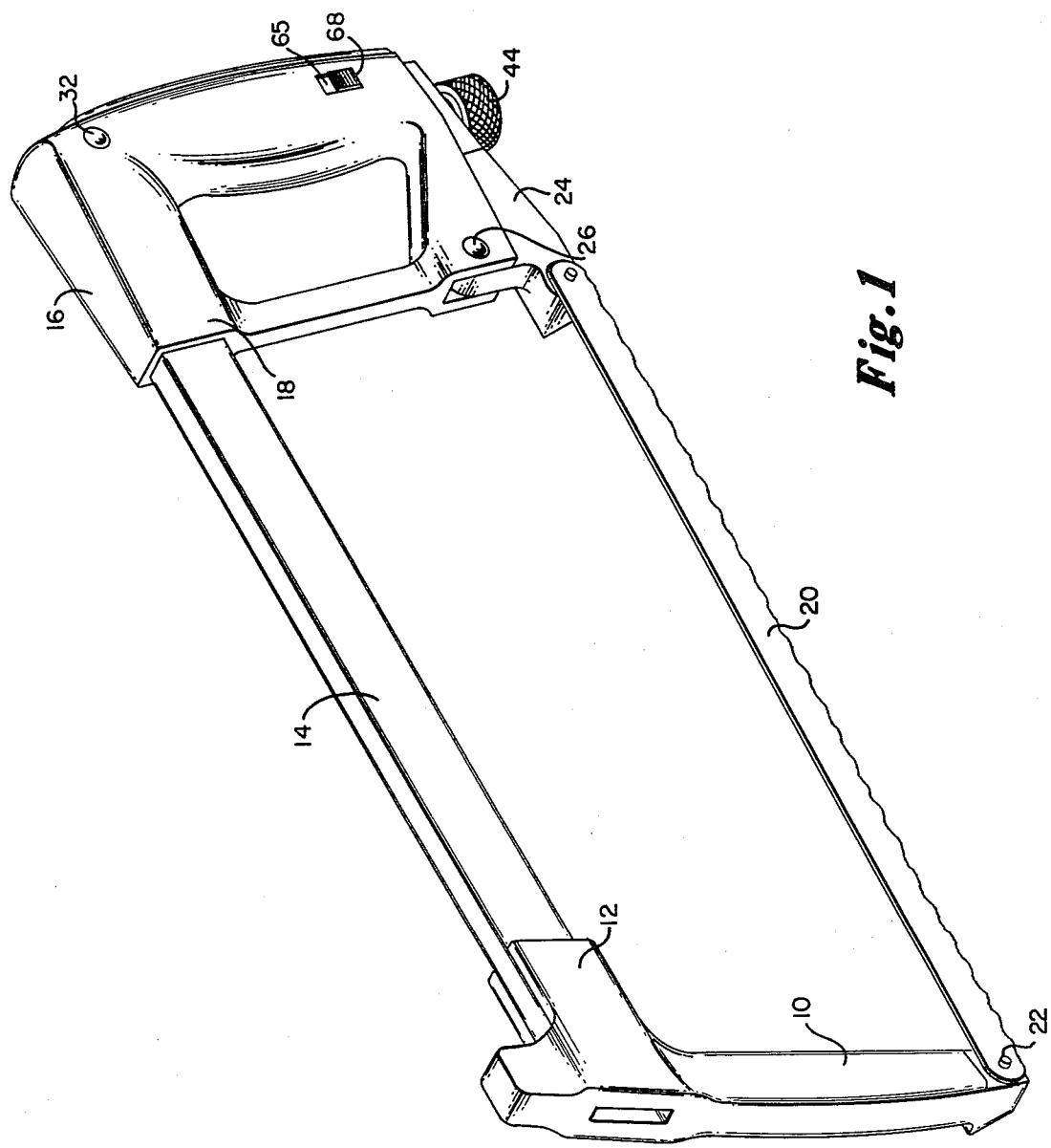
FIG. 1 is a perspective view of the hacksaw of this invention in which the lever is shown closed and locked to the handle.
Figure 2:
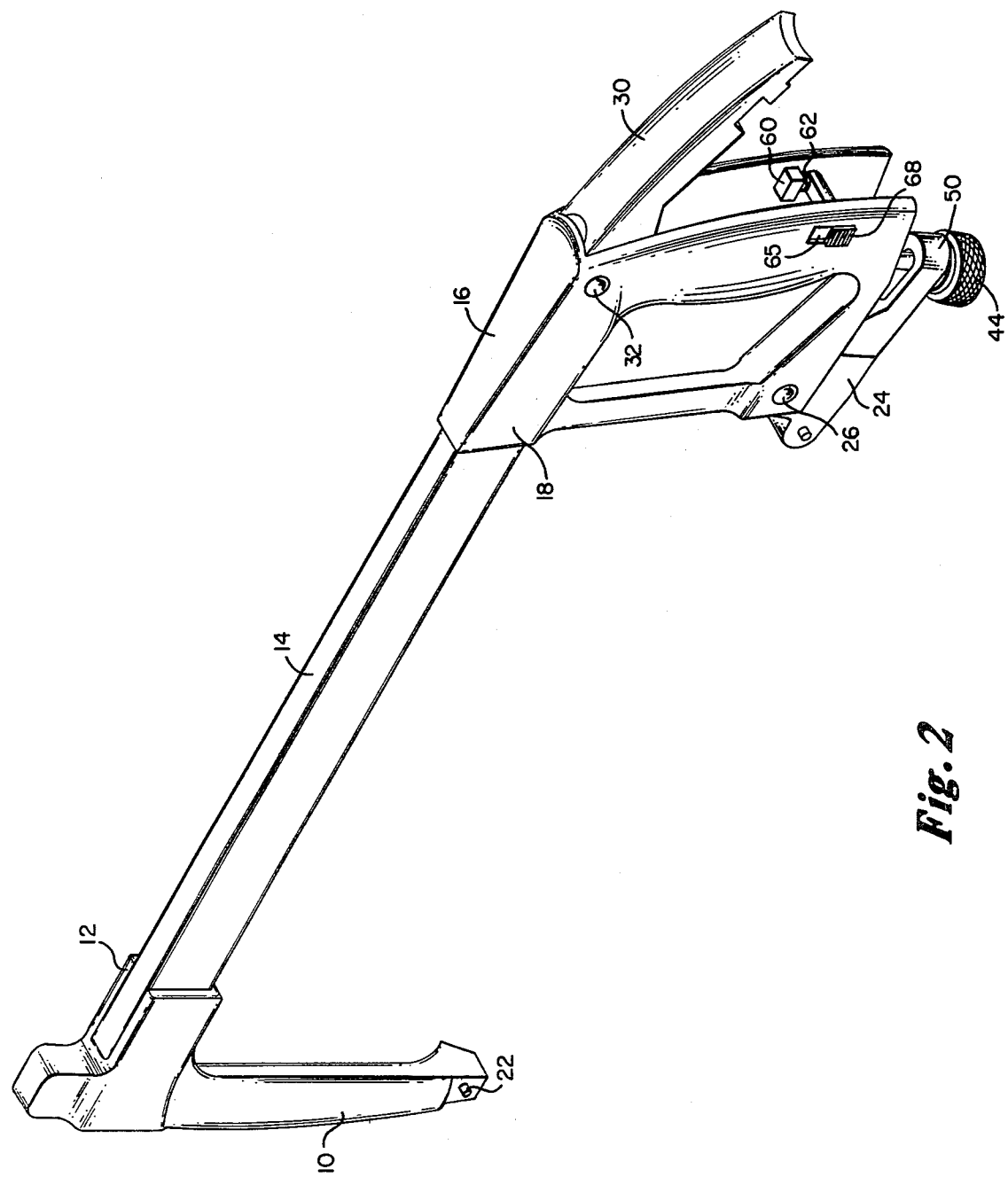
FIG. 2 is another perspective view of the hacksaw in which the lever is shown unlocked and open.

The hacksaw is shown in perspective in FIGS. 1 and 2. The hacksaw includes a front frame member 10 which is generally vertical. Member 10 has a rearwardly opening socket 12 which is sized and shaped to receive the forward end of a top frame bar 14 which has a rectangular cross-section and which is positioned at an approximate right angle to front frame member 10. Horizontal top frame bar 14 is preferably hollow to accommodate spare blades and is fixed to front frame member 10 by means of a retaining screw (unshown) which extends through a socket wall and a top frame bar wall at a right angle to both.

The hacksaw has a handle 16 which has a forwardly opening socket 18 which is sized and shaped to receive the rearward end of top frame bar 14. The handle 16 and the front frame member 10 are preferably made of aluminum, whereas the top frame bar 14 is preferably made of steel.

The hacksaw blade 20 has a mounting aperture at each of its two ends. The front aperture is slipped over the front mounting post 22 which is located at the lower end of the front frame member 10.

A rocker arm 24 is pivotally mounted on the lower portion of handle 16 by means of lower pivot pin 26. A rear mounting post 28 is located on the forward portion of the rocker arm 24, and the rear aperture of blade 20 is slipped over and is held by rear mounting post 28.

Figure 3:
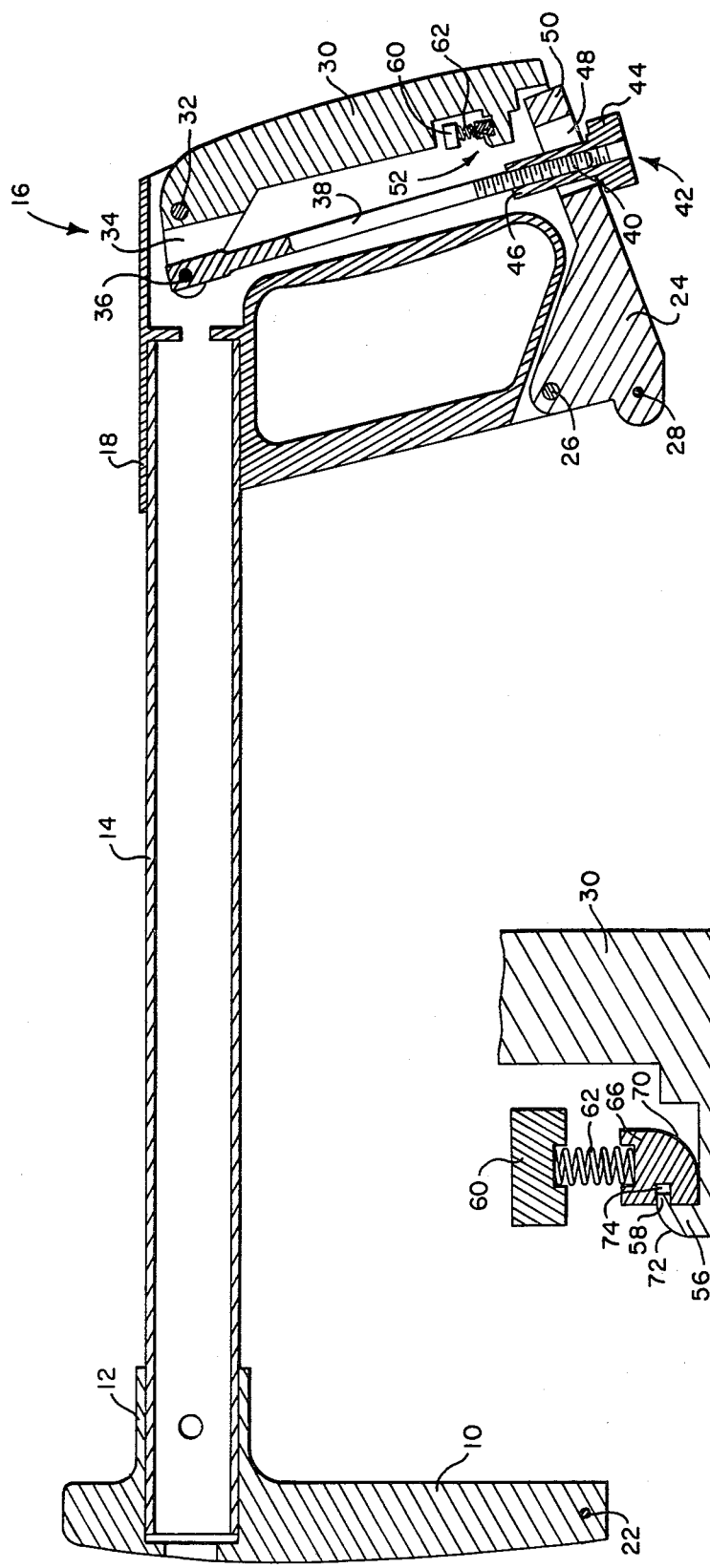
FIG. 3 is a side elevation, in section, in which the lever is shown closed and locked in its almost maximum clockwise position.
Figure 4:
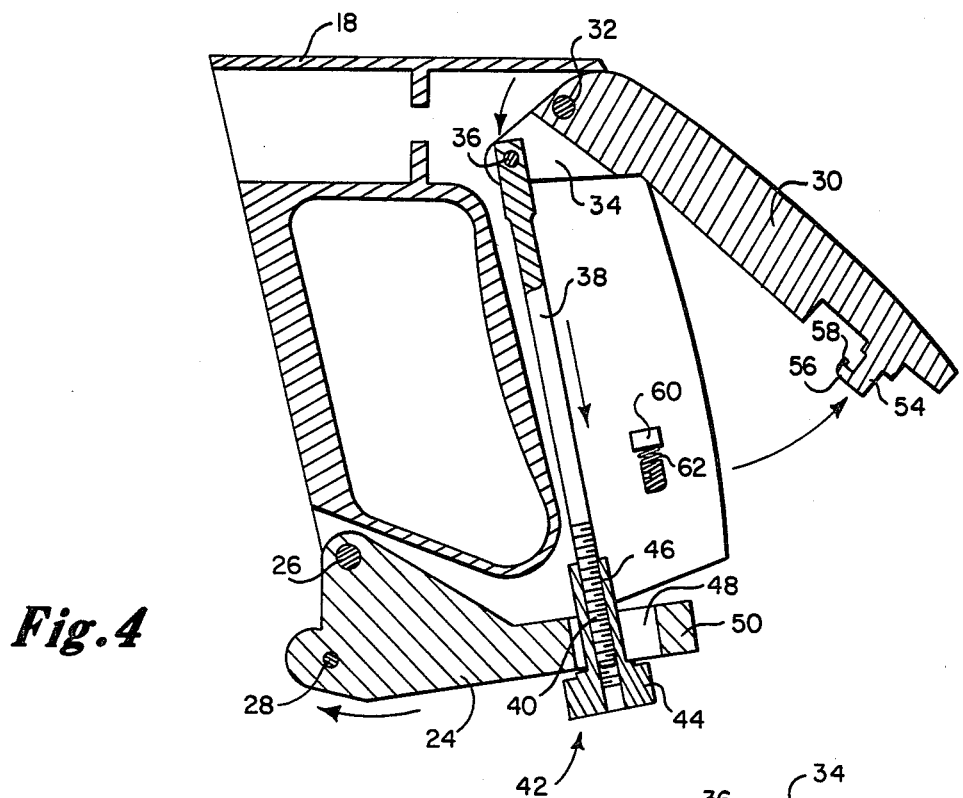
FIG. 4 is a side elevation, in section, of the handle in which the lever is shown unlocked and open in its almost maximum counter-clockwise position.

It will be seen from FIGS. 3-4 that when the rocker arm is pivoted in the clockwise direction about lower pivot pin 26, the rear mounting post 28 moves up and reduces the distance between the front and the rear mounting posts 22 and 28, respectively. Conversely, when rocker arm 24 is pivoted in the counter-clockwise direction about pivot pin 26, the rear mounting post 28 moves down and increases the distance between the front and rear blade mounting posts. Thus, it will be appreciated that blade tension can be adjusted by pivoting the rocker arm to selected angular positions. The structure that has thus far been described is common to both applicant's hacksaw and to the hacksaw shown in U.S. Pat. Des. No. 245,754.

Figure 5:
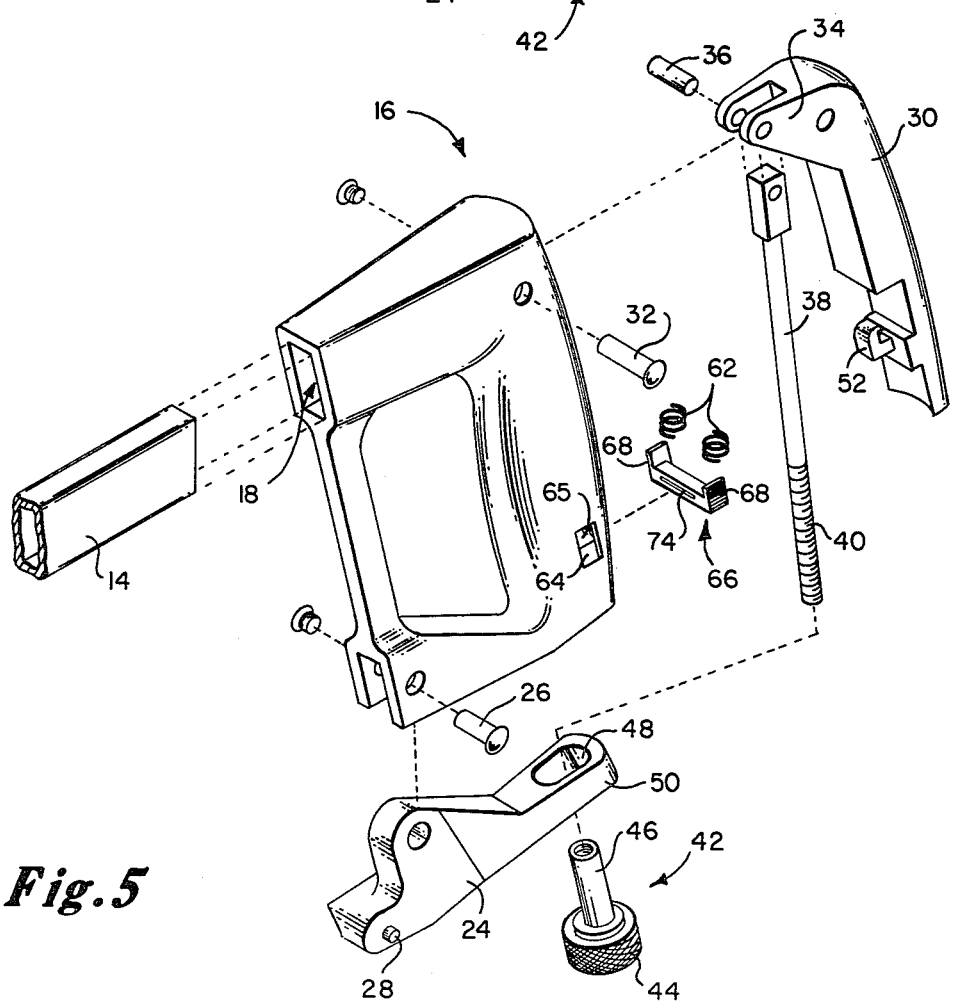
FIG. 5 is an exploded view of the handle and related parts.

Referring now to FIGS. 3-5, applicant's improved blade tensioning mechanism will be described in detail. Movable lever 30 is pivotally mounted at its upper end to the upper portion of handle 16. Lever 30 is pivoted to handle 16 by upper pivot pin 32 and is manually movable between a closed and locked position (FIG. 3) and an open and unlocked position (FIG. 4). The forwardly extending rod mounting portion 34 has aligned transverse apertures in which a rod pivot pin 36 is received and retained.

A tension rod 38 has a transverse bore in its upper end through which rod pivot pin 36 extends. Thus, tension rod 38 is pivotally pinned to rod mounting portion 34 of lever 30 and hangs downwardly. It will be seen that when lever 30 is unlocked and opened (FIG. 4), tension rod 38 will descend, and when lever 30 is closed and locked, tension rod 38 will rise (FIG. 3). The hanging tension rod is threaded at its bottom end 40 for purposes to be subsequently described.

A tension adjusting knob 42 has a large diameter knurled portion 44, and a smaller diameter hollow neck portion 46 which is internally threaded for engagement with the external threads on the bottom end 40 of tension rod 38. Rocker arm 24 has an opening 48 in its rearward portion 50 through which tension rod bottom end 40 downwardly extends, and through which knob neck portion 46 upwardly extends in threaded engagement with rod bottom end 40. It will be seen that turning knob 42 on rod end 40 causes the rearward rocker arm portion 50 to be adjustably moved up or down along tension rod 38. Knob 42 is used to set the exact final distance between the front and rear mounting posts and thus determines the magnitude of the final tension which is placed on blade 20 when lever 30 is closed and locked.

In order to maintain lever 30 in its closed position (FIG. 3), a latch means is provided on the lever and the interior of the grip portion of handle 16. Lever 30 has, near its lower end, an upwardly bent locking finger 52. Like a human finger, locking finger 52 has a first horizontal portion 54, a second vertical portion 56, and a third horizontal or tip portion 58 (see FIG. 6). For reasons which will be subsequently explained, the vertical dimension between the lower face of tip portion 58 and the upper face of first horizontal portion 54 must be carefully chosen, as must the horizontal dimension between the rearward face of second vertical portion 56 and the opposing forward face of lever 30.

The latch means also includes two shoulders 60 which are integral with the interior walls of the hollow grip portion of handle 16 and which extend towards each other. FIG. 2 shows the right shoulder 60 extending from the interior wall of the handle grip. There is a similar left shoulder 60 extending from the hidden opposite interior side of the handle grip. Each shoulder has a cylindrical recess formed in its lower face to receive and retain the upper end of a coil spring 62 which extends downwardly. In other words, there are two shoulders 60 and two coil springs 62.

The hand grip portion of handle 16 has two windows 64 forming opposing openings in the grip walls. Above the windows are recessed channels 65. A movable latch bar 66 (shown most clearly in FIGS. 5-6) extends transversely and has two ribbed finger grips 68 formed at the ends of bar 66. Latch bar 66 extends through windows 64 and the finger grips 68 ride vertically in channels 65. It will be seen that normally the two coil springs 62 will urge latch bar 66 downwardly against the bottoms of the two windows 64. However, the hacksaw user can press upwardly on the two finger grips 68 to raise the latch bar.

The latch bar 66 is generally rectangular in cross-section, but is rounded at a rearward portion to form a latch bar cam surface 70. This surface is located so as to be cammed upwardly by a corresponding rounded forward surface on the second vertical portion 56 referred to as locking finger cam surface 72. Latch bar 66 has a short transverse channel 74 formed in its forward face in position to receive the rearwardly extending locking finger tip 58.

The operation of the tension adjusting mechanism of this invention will now be described in detail. In order to insert and properly tension the hacksaw blade in the frame, the aperture in the front end of blade 20 is first slipped over front mounting post 22 on front frame member 10. Lever 30 is then moved to its unlocked and open position shown in FIG. 4, and knob 42 is backed off to allow rocker arm 24 to move in the clockwise direction about lower pivot pin 26. This reduces the distance between front mounting post 22 and rear mounting post 28. The aperture in the rear end of blade 20 is then slipped over rear mounting post 28, and lever 30 is slightly closed to take up slack and to slightly tension blade 20.

Tension adjusting knob 42 can then be turned to urge the rearward portion 50 of rocker arm 24 upward along tension rod 38. The hacksaw user quickly learns to sense the knob position which will cause the desired amount of resistance to lever closing which will in turn produce the desired degree of tension in the blade when the lever is finally closed and locked. In other words, the user's left and right hands cooperate by making alternate minute adjustments on the knob and the lever in order to choose and obtain the desired amount of final blade tension.

In order to lock in the final blade tension, the lever 30 is locked in the closed position shown in FIGS. 3 and 6. This is accomplished by manually pivoting lever 30 to its maximum clockwise position. During this lever motion, locking finger cam surface 72 engages and cams latch bar cam surface 70 to lift downwardly biased movable latch bar 66. Locking finger 52 passes beneath latch bar 66 until finger tip 58 is clear. Then, latch bar 66 drops because of the action of coil springs 62. The continuous downward force on tension rod 38, produced by blade tension, causes the locking finger to snap back rearwardly when manual squeezing pressure on lever 30 is reduced. As the locking finger moves rearwardly, finger tip 58 enters latch bar transverse channel 74 where it is retained, even against any effort to push upwardly on the two finger grips 68. This is a safety feature preventing accidental unlocking of lever 30.

Intentional unlocking of lever 30 requires the use of two hands with opposite motions. That is, the hacksaw user must initially squeeze lever 30 so that the lever pivots in the clockwise direction from the locked position shown in FIGS. 3 and 6 to the maximum clockwise position in which locking finger tip 58 is moved forwardly entirely out of latch bar transverse channel 74. Then, the user pushes upwardly with his thumb and one finger on finger grips 68 to lift latch bar 66 into approximate abutment with the undersides of shoulders 60. Finally, while upward pressure on finger grips 68 is maintained, the user relaxes his grip on lever 30, permitting the lever to swing open to the position shown in FIG. 4. This permits the blade to be removed from the frame, or alternatively permits the knob 42 to be rotated to increase or decrease the final blade tension setting.

This completes the detailed description of the structure and operation of the preferred embodiment of this invention. It will be appreciated that applicant's improved tension adjustment mechanism permits very fine adjusting and varying of the blade tension. Applicant's mechanism is simple, quick, and requires low manual effort to operate, while applicant's latch means provides an effective safety measure preventing accidental sudden release of blade tension.

The above description obviously suggests many possible variations and modifications of this invention which would not depart from its spirit and scope. It should be understood, therefore, that the invention is not limited in its application to the details of structure specifically described or illustrated and that, within the scope of the appended claims, it may be practiced otherwise than as specifically described or illustrated.

I claim:

1. In a hacksaw of the type having a front generally vertical frame member, a top horizontal frame bar attached at its forward end to the upper end of the front frame member, a handle attached at its upper end to the rear end of the top horizontal frame bar, a rocker arm pivoted to the lower portion of the handle, and a blade held at its forward end by a front mounting post at the lower end of the front frame member, the blade being held at its rear end by a rear mounting post located on the rocker arm near one end thereof, improved means for adjustably applying tension to the blade, said improved tensioning means comprising:

(a) a manually movable lever pivoted adjacent its upper end to the handle, said lever having a rod mounting portion extending forwardly of the lever pivot point;

(b) a tension rod pivoted at its upper end to said rod mounting portion and hanging downwardly, said movable lever and tension rod pivot points being located with relation to each other such that pivoting said lever clockwise causes said tension rod to be lifted, and pivoting said lever counter-clockwise causes said tension rod to be lowered;

(c) a tension adjusting knob means cooperating with the lower end of said tension rod and the other end of the rocker arm for altering the distance between the other end of the rocker arm and the tension rod pivot point; and (d) latch means for locking said lever to the handle;

(e) said lever pivoting in the clockwise direction to increase blade tension, and pivoting in the counter-clockwise direction to decrease blade tension.

2. The hacksaw of claim 1 wherein the rear mounting post is located near the front end of the rocker arm below the rocker arm pivot point, and said tension adjusting knob means cooperates with the rear end of the rocker arm.

3. The hacksaw of claim 1 wherein said tension rod is threaded at its lower end.

4. The hacksaw of claim 2 wherein the rear end of the rocker arm is provided with an opening through which said tension rod hangs downwardly.

5. The hacksaw of claim 2 wherein said tension rod is threaded at its lower end, the rear end of the rocker arm is provided with an opening through which said tension rod hangs downwardly, and said tension adjusting knob means is threadably engaged to the threaded lower end of said tension rod.

6. The hacksaw of claim 5 wherein said tension adjusting knob means bears against the rear end of the rocker arm.

7. The hacksaw of claim 6 wherein said tension adjusting knob means bears against the lower surface of the rear end of the rocker arm.

8. The hacksaw of claim 1 wherein said latch means includes a locking finger mounted on and extending forwardly of the forward surface of said lever.

9. The hacksaw of claim 8 wherein said latch means includes a spring-biased, transversely extending latch bar mounted within the handle, said latch bar positioned to be cammed vertically by the pivotal movement of said lever locking finger, and to spring back to lockably fix said lever to the handle.

10. The hacksaw of claim 9 wherein said lever locking finger has a first horizontal portion which extends forwardly from said lever, a second vertical portion which extends upwardly from said first horizontal portion, and a third horizontal tip portion which extends rearwardly from said second vertical portion, said tip portion acting as a safety means.

11. The hacksaw of claim 10 wherein said lever locking finger and said latch bar are shaped and sized such that unlocking of said lever is accomplished solely by sequentially pivoting said lever to its maximum clockwise position in which said finger tip portion clears said latch bar, then lifting said latch bar until it clears said locking finger, then pivoting said lever in the counter-clockwise direction while maintaining said latch bar in its lifted position.

* * * * *